(12) United States Patent
Schmitt et al.

(10) Patent No.: US 8,703,660 B2
(45) Date of Patent: Apr. 22, 2014

(54) LEAD-FREE SINTERED LUBRICATING MATERIAL AND SINTER POWDER FOR MANUFACTURE OF THE SAME

(75) Inventors: Holger Schmitt, Pfungstadt (DE);
Thomas Enghof, Wiesbaden (DE);
David M. Saxton, Ann Arbor, MI (US)

(73) Assignee: Federal-Mogul Wiesaden GmbH, Wiesbaden (DE)

( * ) Notice: Subject to any disclaimer, the term of this patent is extended or adjusted under 35 U.S.C. 154(b) by 534 days.

(21) Appl. No.: 12/669,363

(22) PCT Filed: Jul. 15, 2008

(86) PCT No.: PCT/EP2008/059233
§ 371 (c)(1),
(2), (4) Date: Jan. 15, 2010

(87) PCT Pub. No.: WO2009/013178
PCT Pub. Date: Jan. 29, 2009

(65) Prior Publication Data
US 2010/0190667 A1 Jul. 29, 2010

(30) Foreign Application Priority Data
Jul. 20, 2007 (DE) .......................... 10 2007 033 902

(51) Int. Cl.
*C10M 103/04* (2006.01)
*C10M 107/00* (2006.01)

(52) U.S. Cl.
CPC .............. *C10M 103/04* (2013.01); *C10M 7/00* (2013.01)
USPC ............................ 508/103; 508/108; 508/155

(58) Field of Classification Search
CPC .............................. C10M 7/00; C10M 103/04
USPC ......................................... 508/108, 155, 103
See application file for complete search history.

(56) References Cited

U.S. PATENT DOCUMENTS

| | | | |
|---|---|---|---|
| 3,177,564 A | | 4/1965 | Reynolds et al. |
| 5,011,510 A | * | 4/1991 | Hayakawa et al. ............. 51/293 |
| 5,937,268 A | * | 8/1999 | Ozaki et al. ................... 428/552 |
| 6,613,453 B2 | | 9/2003 | Sato et al. |
| 2004/0055416 A1 | * | 3/2004 | Dunmead et al. ............... 75/244 |
| 2008/0254316 A1 | | 10/2008 | Roos et al. |

FOREIGN PATENT DOCUMENTS

| | | |
|---|---|---|
| DE | 19708197 A1 | 9/1997 |
| DE | 10305808 A1 | 10/2003 |
| EP | 0224619 | 6/1987 |
| GB | 2374086 A | 10/2002 |

OTHER PUBLICATIONS

Unknown, Boron Nitride Powders Grades HCP, HCPH, HCPL, and AC6004, Momentive Performance Materials, 2 pages, XP-002507455.

Leon, O.A. et al, Wear Mechanism of Ni-P-BH(h) Composite Autocatalytic Coatings, Surface & Coatings Technology 200, pp. 1825-1829, Elsevier B.V.

\* cited by examiner

*Primary Examiner* — Taiwo Oladapo
(74) *Attorney, Agent, or Firm* — Robert L. Stearns; Dickinson Wright, PLLC

(57) ABSTRACT

The invention relates to a lead-free sliding bearing material having a Cu-based or CuSn-based sintered matrix and a solid lubricant. The solid lubricant contains hexagonal boron nitride in a fine-grained distribution with a mean particle size of 10 μm or less, wherein agglomerates of the particles of hexagonal boron nitride are not greater than 200 μm. The invention also relates to a sintering powder for producing the sliding bearing material, a sliding bearing composite material having a steel protective layer and a bearing layer composed of such a sintered-on sliding bearing material. The invention also relates to a sliding element composed of a sliding bearing composite material of the type mentioned above.

Figure 1:
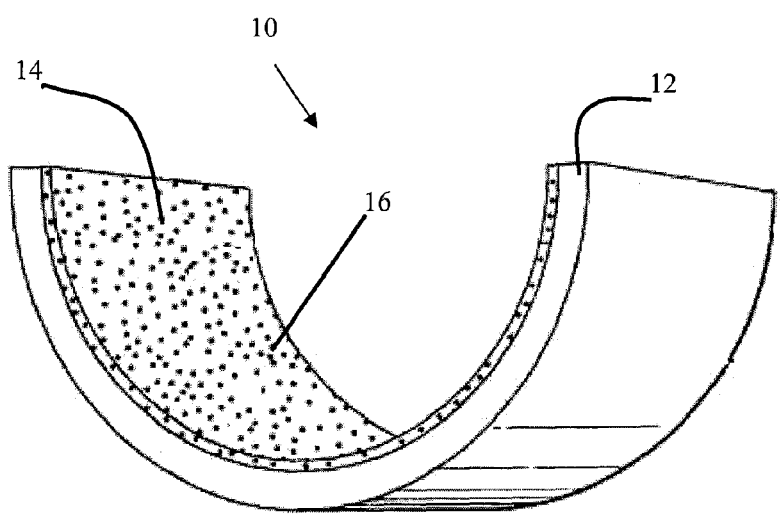

9 Claims, 2 Drawing Sheets

LEAD-FREE SINTERED LUBRICATING MATERIAL AND SINTER POWDER FOR MANUFACTURE OF THE SAME

RELATED APPLICATION

This application is a national stage entry of PCT/EP08/59233 filed on Jul. 15, 2008 which claims foreign priority from German Patent Application No. 10 2007 033 902.1, filed Jul. 20, 2007, which is incorporated by reference in its entirety.

BACKGROUND OF THE INVENTION

1. Technical Field

The invention involves a lead-free lubricating material with a sintered matrix on a Cu or CuSn base and a solid lubricant. The invention also involves a sinter powder for manufacture of the same, a lubricating compound material with a steel supporting layer, and a bearing metal layer of such a sinter-fused lubricating material and a lubricating element.

2. Related Art

Lead-free sintered lubricating with materials made of copper or on a copper and tin base, in particular on the basis of a bronze matrix, are known for their good conductivity of heat and their high resistance to wear and tear and corrosion in comparison to similar materials containing lead. The development of such materials was based on the desire to replace lubricating materials containing lead, since lead has been classified as a material harmful to the environment. Since lead in materials has the function of a solid lubricant, a substitute material must be found for it. Otherwise, for example, a one-phase bronze material lacking a lubricating soft phase would show an increased tendency to seize up under mixed friction conditions. From this point of view, in the literature and in practice a series of various combinations has been studied and put into use.

Aside from lead, the most commonly used solid lubricants are molybdenum disulfide (MoS2) and graphite, which are also used in other lubricating coatings based on another matrix material as solid lubricants.

For example, in U.S. Pat. No. 6,613,453 B2, a sintered lubricating layer on a copper base with a tin content of 7 to 13 weight %, a silver content of 0.7 to 2 weight %, and optionally up to 0.5 weight % of molybdenum disulfide and optionally up to 2 weight % graphite have been suggested as solid lubricants.

EP 0 224 619 A1 treads a different path by suggesting improvement of resistance to corrosion by reducing the lead content in a copper alloy and at the same time providing a bismuth proportion of 5 to 25 weight %. In getting rid of lead, a preferred proportion of bismuth of 12 to 20 weight % and a proportion of tin of 1 to 2 weight % have been noted.

Starting from this point, DE 10 2004 011 831 B3 suggests a sintered lubricating material with 10 to 15 weight % tin, 0.5 to 10 weight % bismuth, 1 to 12 weight % graphite and the rest copper. By adding graphite and with an increased proportion of tin, the amount of bismuth can be reduced and the cost of the lubricating material is thereby reduced. Moreover, this compound permits the complete removal of lead and offers excellent tribological characteristics. To be sure, tin, which is used in this material as a binding material for the solid lubricant graphite, is a comparatively expensive alloy material. Reducing the binding material tin and at the same time reducing the lubricating material bismuth does not seem possible.

Moreover, it should be noted that bismuth like lead has a low melting point, though in general it is harder and more brittle than lead. The lubricating materials graphite and molybdenum disulfide are also problematic. They form compounds with the steel of the supporting layer and in certain circumstances with the material of the expellers and thus influence the flow characteristics of the bearings.

In particular with high loads and high temperatures, as may appear in plain bearing or bush applications, in particular in gearboxes and combustion engines, carbon or molybdenum disulfide as solid lubricants in sintered materials show insufficient chemical durability. This negative characteristic is moreover strengthened by the fact that with an increasing amount of tin the heat conductivity of the matrix drops, and the bearing temperature increases as a result.

Hexagonal boron nitride (h-BN) is also known as a solid lubricant. For example, in DE 197 08 197 it is suggested to add hexagonal boron nitride to a proportion of 0.1 to 3.5 weight % plus 0.1 to 3/5 weight % graphite in the form of a powder mixture to a matrix material on an iron base. The powder mixture is then thickened and under contact with copper or a copper alloy is sintered, whereby the copper or the copper alloy is infiltrated into the pores of the sinter body.

The use of hexagonal boron nitride as a soft component or as a solid lubricant is also known from the article "Wear mechanism of Ni—P—BN(h) composite autocatalytic coatings" by Leon et al., published in *Surface & Coatings Technology* 200 (2005), 1825-1829. In this article, a catalytically applied lubricating layer on a nickel-phosphorus base is described and examined for its tribological characteristics.

SUMMARY OF THE INVENTION AND ADVANTAGES

The subject of the invention is meanwhile a simple to manufacture lubricating material on a copper or copper-tin base, which in particular for mechanically highly stressed bearings it brings to the fore a good heat conductivity and good lubricating behavior under mixed friction conditions.

Using boron nitride or h-BN in a copper matrix is suggested in DE 12 93 967 A and in DE 103 05 808 A1. Nonetheless, in this regard no exact information about the conditions of use is known.

The task of the present invention is to make available an approved material on a copper or copper-tin base with h-BN as a solid lubricant, with which a lubricant with outstanding dry running characteristics, high durability, and a low tendency to interaction can be created, and in which a good sintering capacity and binding to a steel supporting layer is guaranteed.

The inventor has determined that it is possible to create a material compound by mixing hexagonal boron nitride powder with a matrix powder on a copper or copper-tin base and the associated direct sinter fusing and rolling of the powder mix on a steel spine, a compound that has a sufficiently strong binding between the steel substrate and the bearing material on the one hand and the sinter pieces below one another on the other hand.

Ceramic, hexagonal boron nitride exists intergranularly, and does not enter into any physical or chemical bond with a metallic material or with a metallic matrix. In contrast to carbon or molybdenum disulfide, there are no interactions with the steel of the supporting layer or the metal of the expeller, which might detract from the flow characteristics of the bearings or of the expeller. In addition, at temperatures up to 700° C. it is completely inert to gases and liquids, such as motor and gear oils, and therefore especially suitable for use under the aggressive conditions that dominate in automobile engines and gearboxes.

The lubricating capacity of lead and bismuth is exceeded in that hexagonal boron nitride is neither toxic nor carcinogenic, and thus no ecological objections arise.

The hexagonal boron nitride in the lubricating material according to the invention itself possesses a comparatively high capacity to conduct heat. However, just as a fixing-in of the solid lubricant is dependent on the binding material tin, the reduction of tin content in the matrix can significantly increase the conductivity of heat, in essence all the way to the heat conductivity of pure copper. In this way, first a quick channeling away of the friction heat and second a homogeneous distribution of the heat within the material is guaranteed. This assures a temperature-stable micro-structure and with it a consistently good binding between the solid lubricant and the matrix, even at high operating temperatures. The lubricating material is therefore particularly suitable for use in motors, internal combustion engines, and automatic gearboxes.

In addition, hexagonal boron nitride, based on its outstanding lubricating characteristics provides a reduction of the tendency to seize up and an increase of resistance to wear and tear of a bush or a plain bearing, particularly under mixed friction conditions and independent of the bearing temperature, and especially of the conditions of failure to lubricate or of inconsistent provision of lubricating oil.

As is well-known, the matrix material is medium hard, which can be reduced by the addition of solid lubricants. This is also the case in the use of hexagonal boron nitride according to the invention. On the other hand, however, it is known that the hardness increases with increasing distortion. Now an additional effect has appeared in that by the in-binding of the h-BN particles as a solid lubricant, the solidity of the material is less dependent on the degree of distortion of the matrix than in the standard solid lubricants. This effect becomes even stronger as the proportion of boron nitride becomes greater. From here the practical advantage results that the material retains its solidity and thus its ability to adjust its form as first set by the concrete compound, independent of the demands made on it.

This increases the lifetime of the bearing when there is uneven stress on a bearing, such as in supporting edges due to improper positioning between the bearing and the expeller.

According to the invention, the h-BN appears in a fine-grained distribution with an average grain size of 10 μm or less. An average grain size of 5 to 7 μm is preferred.

The size distribution of the h-BN particles does not change as a result of the sintering, and as a result the particles of the same average grain size in the sinter powder may be assumed to be in the material. A good homogeneous distribution of the H—BN particles is set in the stressed average grain size, and therefore there is a sufficiently strong binding-in of these particles in the bronze matrix. In this way a durable good and equal lubrication is assured over the entire lifetime.

According to the invention, the particles of hexagonal boron nitride are at least partly agglomerated, whereby the agglomeration of the particles is not greater than 200 μm. A size of not greater than 120 μm is preferred, and not more than 80 μm is especially preferred. The size of the agglomerate is set in a known manner, in that micro-ground sections are taken, and these ground sections are measured under the light-optical microscope, whereby the particular largest observed length of the agglomerate is drawn in.

The boron nitride agglomerates are preferably not larger than the average observed grain size of the sintered matrix. Measured according to ASTM standard E-112, this is preferably 2 to 3.5, which corresponds to a cross-section of 179.6 to 106.8 μm.

If the h-BN agglomerates are too large, this leads to a reduced capacity to sinter and to binding problems on the edge areas between the bearing metal layer and the steel support layer. The tendency to form larger agglomerates depends on the h-BN content in that total composition of the bearing metal. The degree of agglomeration can be adjusted by a proper grinding technique and duration of grinding of the sinter powder for a given h-BN content.

The proportion of hexagonal boron nitride in the total composition of the lubricating material preferably amounts to 0.05 to 5 weight %, in particular 0.05 to 0.3 weight %, and 0.25 to 2 weight % is especially preferred. The best results can be achieved in a range of 0.5 to 1 weight % boron nitride in the lubricating material.

If the proportion of h-BN particles is less than 0.05 weight % in the total composition, then sufficient lubrication is not guaranteed, in particular under mixed friction conditions. Moreover, if sintering is done many times and with too low an h-BN content, a spontaneous bulge may form on the upper surface.

Preferentially the matrix has 0 to 10 weight % tin, and especially preferred is 2 to 8 weight % tin.

In an especially advantageous embodiment, the matrix is formed of a CuSn6Ni- or a CuSn8Ni-bronze.

An advantageous further development of the invention envisages that the lubricating material has a hard phase, formed at least by a substance from the group consisting of Fe3P, MoSi2, c-BN (cubic boron nitride). The hard part preferred in a size of a maximum 3 weight %, and after use especially preferred of up to 1 weight %. With regard for the resistance to wear and tear and sintering capacity, the best results are observed in the range of 0.01 to 0.5 weight %.

The lubricating material according to the invention is used preferably in a lubricant compound material with a steel supporting layer and a lubricating bearing coat. A lubricating element from such a lubricating bearing compound is especially preferred, in particular if it creates a bush or a bearing shell.

THE DRAWINGS

Other tasks, characteristics, and advantages of the invention are discussed more exactly below on the basis of an example of an embodiment with the help of the drawings. The following are shown:

FIG. 1 a perspective representation of a bearing half-shell with the characteristics of the invention.

Figure 2:
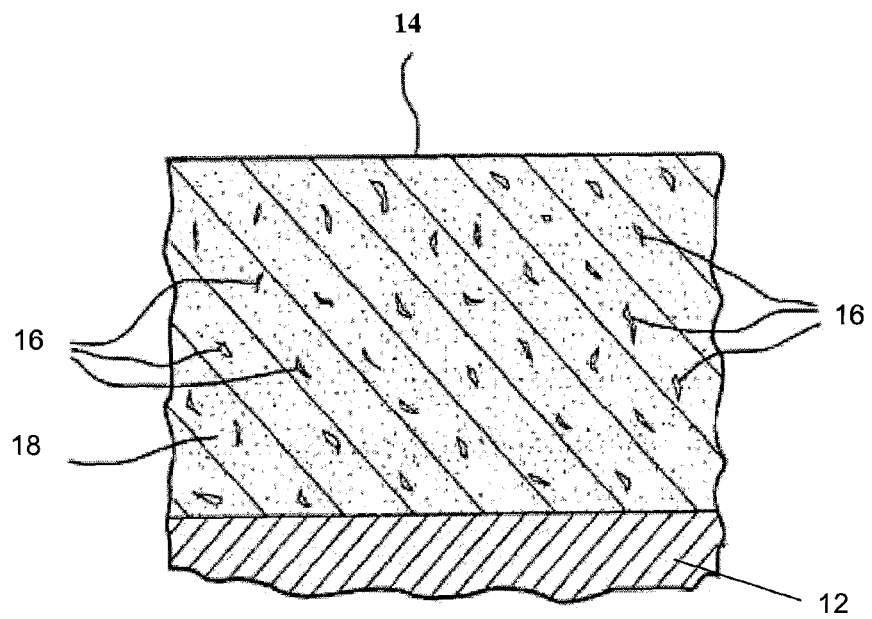
Figure 3:
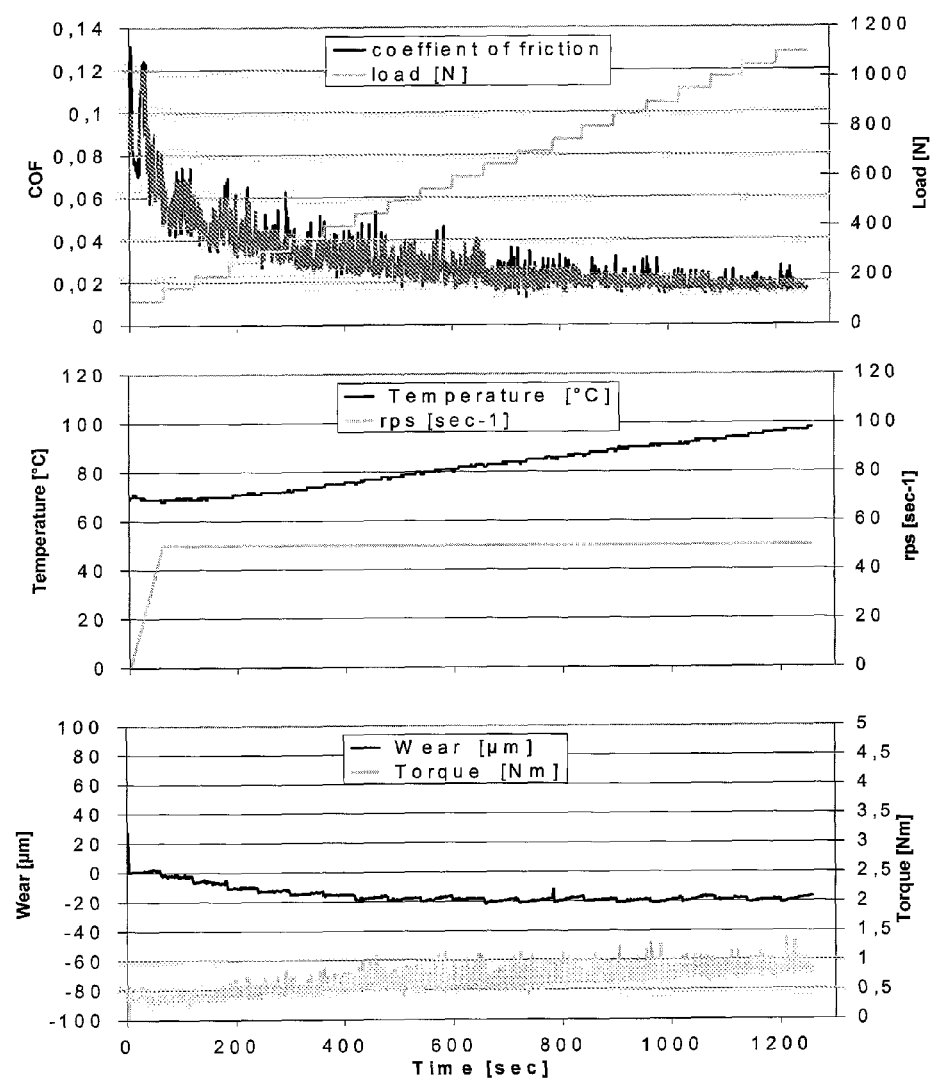

FIG. 2 An enlarged section cut out through the bearing shell according to FIG. 1, and FIG. 3 diagrams for running a test of a lubricating element according to the invention.

DETAILED DESCRIPTION

The embodiment shown in FIG. 1 of the lubricating element according to the invention as a bearing half shell 10 is for example used in the large connecting bearing for the crank shaft bearings or as the chief bearing of the crank shaft in internal combustion engines. It has a radial steel support layer 12 lying on the outside and a radial sinter-fused bearing metal layer 14 on the inner side of the steel support layer 12. The bearing metal layer 14 according to the invention has a bronze matrix 18, and in the bronze matrix hexagonal boron nitride particles 16 as a solid lubricant distributed well homogeneously, as shown in FIG. 2.

The lubricating material of the bearing metal layer of 14 with a matrix of copper or of a copper-tin alloy, in particular one of bronze, and with particles of hexagonal boron nitride, is very capable of sintering and can be sinter-fused with sufficient binding fastness directly onto the steel support layer 12 without applying an intermediate layer.

The results of a pin-disk test run with a sample of the lubricant material according to the invention with a CuSn8Ni matrix and 1 weight % h-BN, in which the sample with 4 mm diameter was pressed against a rotating disk of carbon steel 100Cr6, are given in the measurement presented in FIG. 3. The friction value (line drawn through) in the upper diagram of FIG. 3 is applied against the duration of the trial. During the measurement, the load strength was gradually increased from 100 N to 1100 N. It turned out that the material in total has a very low friction value, and that even at maximum loading it shows no sign of wear and tear of the material. Starting from around 0.06, the value within a running-in period of about 10 minutes declines to about 0.015 and hardly changes at all thereafter.

A smaller rise in temperature is associated with the low constant friction value of the pin, something that indicates a high heat conduction capacity of the lubricating material. One may see from the central diagram of FIG. 3 that over a period of 22 minutes at constant RPM a temperature rise from 60° to 80° is recorded.

The lower diagram in FIG. 3 shows on one side the wear and tear value and on the other side the wear moment. The diagram shows that after a running-in period of 10 minutes, despite an increase in the load, no noticeable wear takes place any longer. The wear moment curve reflects the same thing. This shows that despite the moderate increase due to the increasing force load, no deterioration of the lubricating abilities of the material is noticeable.

In the following table 1, four samples of the lubricant compound material according to the invention were studied under distortion with a steel support layer and a sinter-fused bearing metal layer, consisting of a CuSn8Ni-Matrix and 1.0 weight % h-BN particles. Samples 1 to 4 initially show an identical thickness of the steel support layer; with the increasing sample number they show an applied, unsintered powder layer with increasing thickness. After the initial sintering, the samples were rolled on an intermediate measure, and then the thickness and the hardness values of the individual layers were measured. After a further sintering step and another rolling step, in which the thickness was reduced by approximately 5%, and the lubricating material was brought to the end measure, the thicknesses and hardnesses of the individual layers were measured again. It turns out that essentially the metal bearing layer has a hardness that remains the same in the completed rolled status, regardless of the initial thickness of the sintering layer at the same end measure and regardless of the level of deforming or thickening of the bearing metal layer. The setting of the low end hardness of the material essentially rests on the second sintering step and the subsequent rolling step.

TABLE 1

|  |  | Rolling step | | | |
|---|---|---|---|---|---|
|  |  | 1 | 2 | 3 | 4 |
| Total thickness of the sample after the first sintering (mm) |  | 2.27 | 2.32 | 2.36 | 2.4 |
| Thickness of the steel layer (mm) | between | 1.10 | 1.12 | 1.08 | 1.08 |
|  | completed | 1.05 | 1.04 | 1 | 1 |
| Thickness of the bearing metal layer (mm) | between | 0.59 | 0.58 | 0.62 | 0.62 |
|  | completed | 0.56 | 0.57 | 0.58 | 0.6 |
| Total thickness (mm) | between | 1.69 | 1.70 | 1.70 | 1.70 |
|  | completed | 1.61 | 1.61 | 1.58 | 1.6 |
| Total reduction (%) |  | — | 29 | 31 | 33 | 33 |
| Steel hardness (HBW 1/30/10) | between | 195 | 201 | 195 | 190 |
|  | completed | 140 | 139 | 145 | 147 |
| Bearing metal hardness (HBW 1/5/30) | between | 185 | 177 | 181 | 177 |
|  | completed | 93 | 82 | 91 | 94 |

Starting from the same matrix material CuSn8Ni, the hardness of the bearing metal layer was examined, first depending on the h-BN content and second depending on the level of the deforming of the bearing metal layer. The measurement values are given in Table 2.

Starting from a pure sintered matrix material (sample 5), it may be determined that this sample shows a comparatively high hardness in its initial state and a strong increase in hardness depending on the level of deforming. As the h-BN content increases, both the initial hardness and the increase in hardness upon the formation of the bearing metal layer decrease. This means first that with a high h-BN content a soft bearing metal layer can be created, and second, that the hardness of the layer in this area can hardly be adjusted by post-processing any more than through adjustment of the h-BN content. The advantage of such a layer is its high capacity to have its form adjusted, quite independent of the degree of distortion and thus from the load placed on it. Therefore, the capacity to adjust the form remains practically unaltered even under unequal load situations when using the material. If one wishes to be able to adjust the hardness of the bearing metal layer in a broader area, then lower h-BN content must be chosen, whereby an adjustment can increasingly be achieved through the level of deformation.

TABLE 2

| Sample | h-BN content (Weight %) | Hardness 1. Line HBW 1/30/10 2. Line HBW 1/5/30 | Deformation [%] |
|---|---|---|---|
| 5 | 0 | 144 | 20 |
|  |  | 104 | 6.7 |
| 6 | 0.5 | 140 | 19.1 |
|  |  | 95 | 7.4 |
| 7 | 1 | 138 | 20.6 |
|  |  | 97 | 6.7 |
| 8 | 2 | 126 | 20 |
|  |  | 93 | 6.7 |
| 9 | 4 | 98 | 21.4 |
|  |  | 83 | 3.9 |

In the following table 3, the lubricating material according to the invention is contrasted to a comparable material made of CuSn3Pb23 with lead as a solid lubricant and to two comparable materials arising out of the pure CuSn8Ni matrix. Both the comparable materials of the pure bronze matrix were set at various initial hardnesses of the band material from 105 HBW to 130 HBW through varied compression in the last rolling step. Typical bearing metal materials containing lead have a comparatively low hardness of 70 HBW. It is also known that these materials experience a very low solidification through deformation into a bearing shell. On the basis of these properties, they have an exemplary ability to adjust their form, which does not deteriorate even upon deformation or upon heavy demands during operations. The materials containing lead therefore are used in most applications as a measuring rod.

It has now turned out that the lubricating material according to the invention allows a series of advantageous properties to be adjusted upon optimization of the amount of hexagonal boron nitride, whose particle size, level of agglomeration, and upon use of proper matrix materials and even approximately allows setting a series of advantageous properties and even approximately permits attaining the strength of adjusting the form and the durability of materials that contain lead. Hereby the material according to the invention surpasses the materials containing lead because of its good capacity to conduct heat, and finally by the fact that its use does not meet any ecological objections.

TABLE 3

| Hardness (HBW 1/5/30) | Band material (bearing metal) | Bearing shell (bearing metal) |
| --- | --- | --- |
| CuSn8Ni + h-BN 1 weight % | 92 | 104 |
| Comparable materials: | | |
| CuSn3Pb23 | 70 | 85 |
| CuSn8Ni soft | 105 | 125 |
| CuSn8Ni hard | 130 | 150 |

What is claimed is:

1. A lead-free lubricating material with a sintered matrix made of Cu or on a CuSn basis and a solid lubricant, wherein the solid lubricant contains particles of hexagonal boron nitride having an average particle size of 10 μm or less, wherein the particles of hexagonal boron nitride are at least partly agglomerated, and the agglomerates of the particles of hexagonal boron nitride are not greater than 200 μm, and wherein the agglomerates of the particles are not greater than the average observed grain size of the sintered matrix.

2. A lubricating material according to claim 1, wherein the particles of hexagonal boron nitride have an average particle size of 5 μm to 7 μm.

3. A lubricating material according to claim 1, wherein the agglomerates of the particles are not grater than 80 μm.

4. A lubricating material according to claim 1, wherein the average observed grain size of the sintered matrix, measured by ASTM standard E-112, is 2 to 3.5.

5. A lubricating material according to claim 1, wherein the hexagonal boron nitride is present in an amount of 0.05 to 5 weight % of the total composition of the lubricating material.

6. A lubricating material according to claim 5, wherein the hexagonal boron nitride is present in an amount of 0.05 to 1 weight % of the total composition of the lubricating material.

7. A lubricating material according to claim 1, wherein the matrix has 0 to 10 weight % tin.

8. A lubricating material according to claim 7, wherein the matrix is formed of a CuSn6Ni- or a CuSn9Ni-bronze.

9. A lubricating material according to claim 1 further including a hard phase, wherein the hard phase includes one or more substances from the group consisting of $Fe_3P$, $MoSi_2$, c-BN.

* * * * *